US012399566B2

(12) United States Patent
Sathe et al.

(10) Patent No.: US 12,399,566 B2
(45) Date of Patent: Aug. 26, 2025

(54) SYSTEM FOR MEASURING AND CALIBRATING TOUCH, FORCE, AND HAPTIC OUTPUT AT A TOUCH SENSOR (71) Applicant: Sensel, Inc., Sunnyvale, CA (US)

(72) Inventors: Ninad Sathe, Sunnyvale, CA (US); Ilya Daniel Rosenberg, Sunnyvale, CA (US); Kirsten Etzold, Sunnyvale, CA (US); Tomer Moscovich, Sunnyvale, CA (US); Darren Lochun, Sunnyvale, CA (US); Jacob Terracina, Sunnyvale, CA (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/615,863

(22) Filed: Mar. 25, 2024

(65) Prior Publication Data
US 2024/0319822 A1 Sep. 26, 2024

Related U.S. Application Data (60) Provisional application No. 63/454,510, filed on Mar. 24, 2023.

(51) Int. Cl.
G06F 3/01 (2006.01)
G06F 3/041 (2006.01)

(52) U.S. Cl.
CPC ............ G06F 3/016 (2013.01); G06F 3/0418 (2013.01)

(58) Field of Classification Search
CPC ..... G06F 3/0418; G06F 3/016; G06F 3/03545
See application file for complete search history.

(56) References Cited

U.S. PATENT DOCUMENTS

| 11,231,812 | B2* | 1/2022 | Moscovich | G06F 3/016 |
| 2013/0278542 | A1 | 10/2013 | Stephanou et al. | |
| 2015/0309598 | A1 | 10/2015 | Zeliff et al. | |
| 2016/0357343 | A1 | 12/2016 | Falkenburg et al. | |
| 2020/0408659 | A1 | 12/2020 | Hedayat et al. | |
| 2023/0079470 | A1 | 3/2023 | Moscovich et al. | |

OTHER PUBLICATIONS

International Search Report and Written Opinion for International Patent Application No. PCT/US24/21356 mailed on Jul. 15, 2024; 11 pages.
Notification of the International Application Number and of the International Filing Date for International Patent Application No. PCT/US24/21356 mailed on Apr. 14, 2024; 1 page.

* cited by examiner

Primary Examiner — Amy He (57) ABSTRACT

A touch assembly includes: an outer tip; an inner tip; a circuit board; a vibration sensor; and a spring element. The outer tip includes a distal end defining an outer contact surface. The inner tip: is arranged concentrically within the outer tip; extends from the distal end of the outer tip; and defines an inner contact surface. The circuit board is arranged over a proximal end of the outer tip. The spring element: is interposed between the circuit board and the inner tip; couples the inner tip to a reference potential; and is configured to, during a haptic feedback cycle at a touch sensor in response to application of the inner tip toward the touch sensor, yield to locate the inner contact surface coplanar with the outer contact surface. The vibration sensor is arranged on the circuit board and configured to output vibration signals during the haptic feedback cycle.

20 Claims, 6 Drawing Sheets

SYSTEM FOR MEASURING AND CALIBRATING TOUCH, FORCE, AND HAPTIC OUTPUT AT A TOUCH SENSOR

CROSS-REFERENCE TO RELATED APPLICATIONS

This application claims the benefit of U.S. Provisional Application No. 63/454,510, filed on 24 Mar. 2023, which is hereby incorporated in its entirety by this reference.

This application is related to U.S. Non-Provisional application Ser. No. 18/207,603, filed on 8 Jun. 2023, Ser. No. 18/200,304, filed on 22 May 2023, and Ser. No. 18/141,317, filed on 28 Apr. 2023, each of which is hereby incorporated in its entirety by this reference.

TECHNICAL FIELD

This invention relates generally to the field of touch sensors and more specifically to a new and useful measurement and calibration system 100 in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
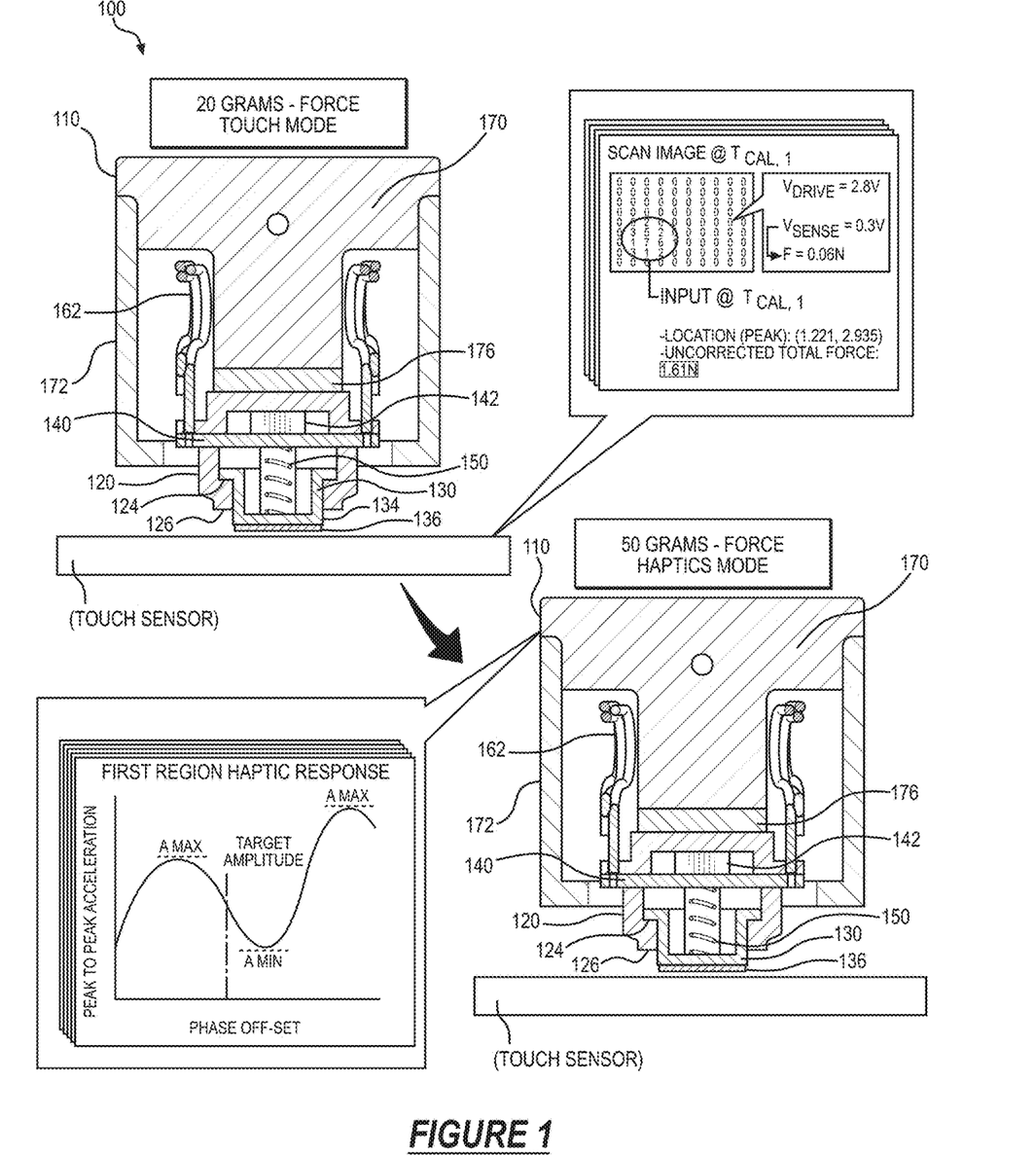
FIG. 1 is a schematic representation of a system.
Figure 2:
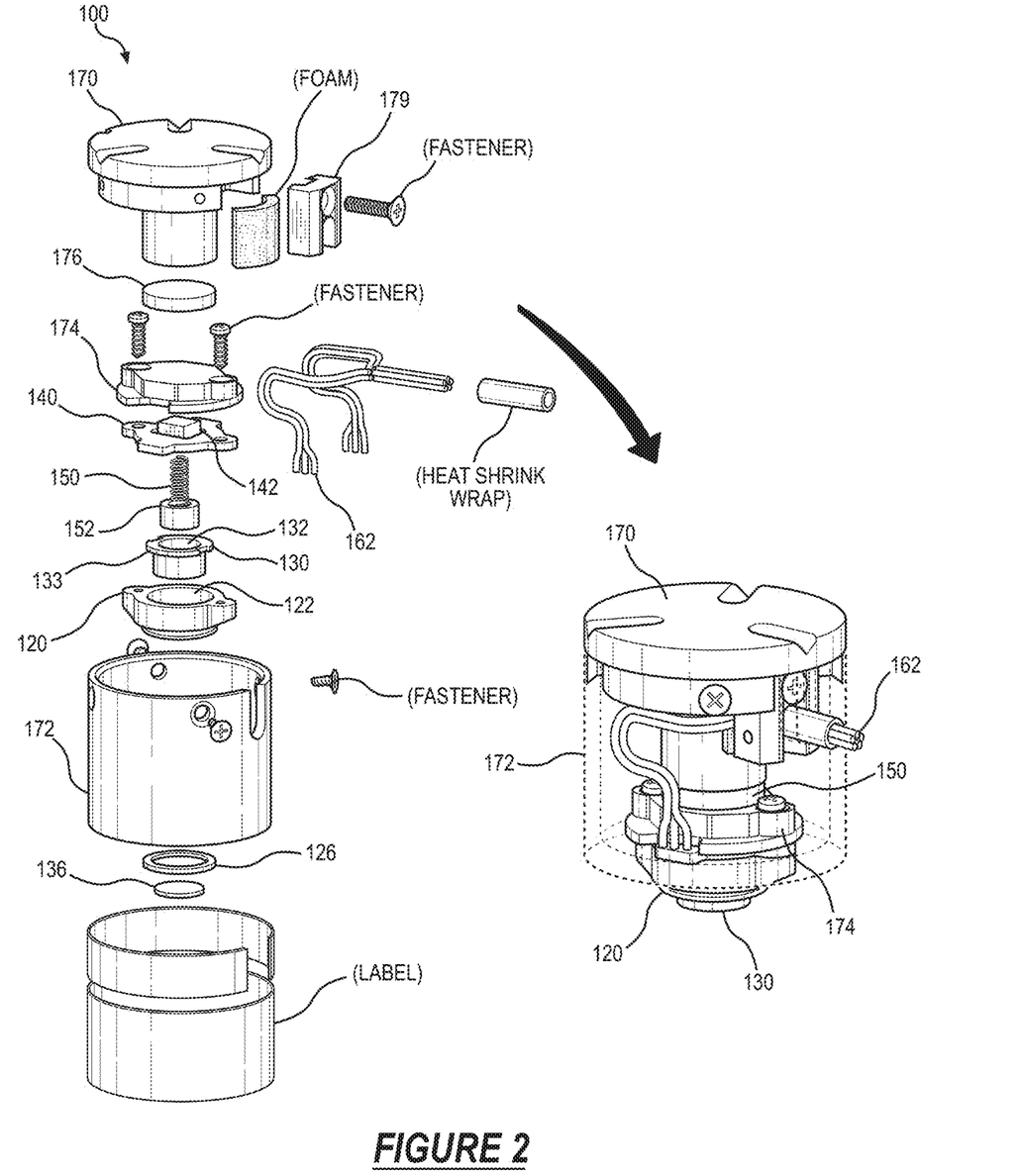
FIG. 2 is a schematic representation of the system.

As shown in FIG. 1, a system 100 for characterizing touch and haptics responses of surfaces includes a tip assembly 110 including: an outer tip 120; a conductive inner tip 130; a circuit board 140; a vibration sensor 142; and a spring element 150.

The outer tip 120 includes: a distal end; an aperture 122 proximal the distal end; and an outer contact surface 126 arranged about the aperture 122.

The conductive inner tip 130: is arranged concentrically within the outer tip 120; extends through the aperture 122 of the outer tip 120; and includes an inner contact surface 136.

The circuit board 140 is arranged adjacent a proximal end of the outer tip 120.

The vibration sensor 142: is arranged on the circuit board 140; and is configured to output vibration signals representing vibrations transferred into the outer tip 120 and into the conductive inner tip 130.

The spring element 150: is interposed between the circuit board 140 and the conductive inner tip 130; couples the conductive inner tip 130 to a reference potential; and is configured to yield responsive to a force applied to the conductive inner tip 130 that translates the conductive inner tip 130 within the outer tip 120.

The tip assembly 110 is operable in a first configuration during application of the conductive inner tip 130 on a touch sensor surface of a touch sensor at a first selection force, the inner contact surface 136 offset vertically from the outer contact surface 126 and the conductive inner tip 130 effecting electrical values across drive and sense electrodes in the touch sensor in the first configuration.

The tip assembly 110 is also operable in a second configuration during a haptic feedback cycle at the touch sensor in response to application of the conductive inner tip 130 on the touch sensor surface of the touch sensor at a second selection force greater than the first selection force, the inner contact surface 136 coplanar with the outer contact surface 126 and the outer tip 120 and the conductive inner tip 130 transferring vibrations from the touch sensor surface into the vibration sensor 142 in the second configuration.

2. Applications

Generally, the system 100 can—in conjunction with a touch sensor—execute a single measurement routine (e.g., touch response measurement, haptics intensity measurement) in order to selectively: apply (e.g., drag) a conductive inner tip 130 of a tip assembly 110 across regions of a touch sensor surface of the touch sensor at a first selection force (e.g., between 10 grams-force and 35 grams-force) to measure touch (e.g., capacitive touch) and force response from the touch sensor; or apply (e.g., couple) an outer tip 120 of the tip assembly 110 across regions of the touch sensor surface at a second selection force (e.g., greater than 50 grams-force)—greater than the first selection force—to measure haptic response (e.g., haptic intensity) across the touch sensor surface during execution of a haptic feedback cycle at the touch sensor. Thus, rather than manually changing measurement tips (e.g., haptics measurement tip, touch measurement tip) to measure touch and haptic response at the touch sensor, the system 100 can autonomously transition the tip assembly 110 between a touch mode and a haptics mode to capture touch, force, and haptics data from the touch sensor within a single measurement routine.

In particular, the system 100 can include: a probe arranged over a touch sensor; and a tip assembly 110 coupled to the probe and configured to 1) effect electrical values across drive and sense electrodes (e.g., capacitive touch sensors, capacitive force sensors) at the touch sensor and 2) detect vibrations across the touch sensor surface during a haptic feedback cycle at the touch sensor. The tip assembly 110 can include an outer tip 120 including: an inner channel; and an outer contact surface 126 (e.g., annular elastomeric material structure) arranged at a distal end of the outer tip 120. Additionally, the tip assembly 110 can include a conductive inner tip 130: arranged concentrically within the inner channel of the outer tip 120; extending from a distal end of the outer tip 120; and including an inner contact surface 136 (e.g., circular conductive surface).

The tip assembly 110 also includes: a circuit board 140 arranged over a proximal end of the outer tip 120 to enclose the inner tip 130 within the channel of the outer tip 120; and a vibration sensor 142 arranged on the circuit board 140 and configured to detect vibration signals transferred from the outer tip 120 and the conductive inner tip 130. The system 100 further includes a spring element 150 interposed between the conductive inner tip 130 and a circuit board 140 arranged over the outer tip 120. More specifically, the spring element 150 is configured to: in response to application of the first selection force to the inner tip 130, maintain the inner contact surface 136 vertically offset from the outer contact surface 126 to operate the tip assembly 110 in the touch mode; and, in response to application of the second selection force—greater than the first selection force—to the inner tip 130, vertically translate the conductive inner tip 130 within the outer tip 120 to locate the inner contact surface 136 coplanar with the outer contact surface 126 and operate the tip assembly 110 in the haptics mode. Thus, the system 100 can transition the tip assembly 110 from the touch mode to the haptics mode In one example, system 100 can: drive a voltage signal across the inner tip 130; and drive the probe at a first target selection force (e.g., 10 gram-force to 35 gram-force) to apply (e.g., drag) the inner tip 130 across regions of the touch sensor surface of the touch sensor. The system 100 can also couple the inner tip 130 to a virtual ground and drive the probe at a second target selection force (e.g., 40 gram-force-100 gram-force), greater than the first target selection force to: vertically translate the inner tip 130 within the outer tip 120; couple the outer tip 120 to a particular region on the touch sensor surface of the touch sensor; and trigger a haptic feedback cycle at the touch sensor. Thus, the system 100 can, during a measurement routine, operate both: in a touch mode to induce touch response and force response across regions of the touch sensor; and a haptics mode to record haptic intensities—during a haptic feedback cycle—across regions of the touch sensor.

In another example, during a first time period in a measurement routine, the system 100 can: trigger the probe to apply the inner tip 130, at a first target selection force (e.g., 10 gram-force-35 gram-force), on a first region of the touch sensor surface of the touch sensor; drive a voltage signal across the inner tip 130 to induce variations in electrical values across an array of drive and sense electrode pairs at the touch sensor; and drive (e.g., drag) the probe across a sequence of locations in the first region of the touch sensor surface. Accordingly, during the first time period, the touch sensor can then: capture a sequence of touch images representing magnitudes of forces detected on the touch sensor surface; and transmit the sequence of touch images to the system 100.

Additionally, during a second time period following the measurement routine, the system 100 can: drive the probe to a target haptic location in the first region on the touch sensor surface; and trigger the probe, at a second target selection force greater than the first target selection force (e.g., 40 gram-force-100 gram-force), to laterally translate the inner tip 130 within the outer tip 120 and apply direct contact of the outer tip 120 and the inner tip 130 at the touch sensor surface. Accordingly, during the second time period, the touch sensor can then, in response to applying the second target selection force at the first region on the touch sensor surface, execute a haptic feedback cycle to oscillate the touch sensor surface of the touch sensor. The system 100 can then: record a haptic feedback intensity (e.g., peak to peak intensities) at the touch sensor surface during the haptic feedback cycle; generate a vibration image representing haptic response at the first region of the touch sensor surface; fuse the sequence of touch images and the vibration images into a response map; and store the response map in local memory of the system 100.

Therefore, the system 100 can then: retrieve the response map representing touch, force, and haptic response of the touch sensor from local memory; calibrate input force thresholds across an area of the touch sensor based on the response map and thus compensate for manufacturing variance and manufacturing defects within the touch sensor in order to enable more accurate and repeatable detection and responses to inputs across the touch sensor surface as a function of applied force; and calibrate haptic feedback response across regions of a touch sensor surface based on the response map and thus compensate for haptic signal interference across the touch sensor surface generated during concurrent actuation of two or more haptic feedback modules.

3. Touch Sensor

Figure 4:
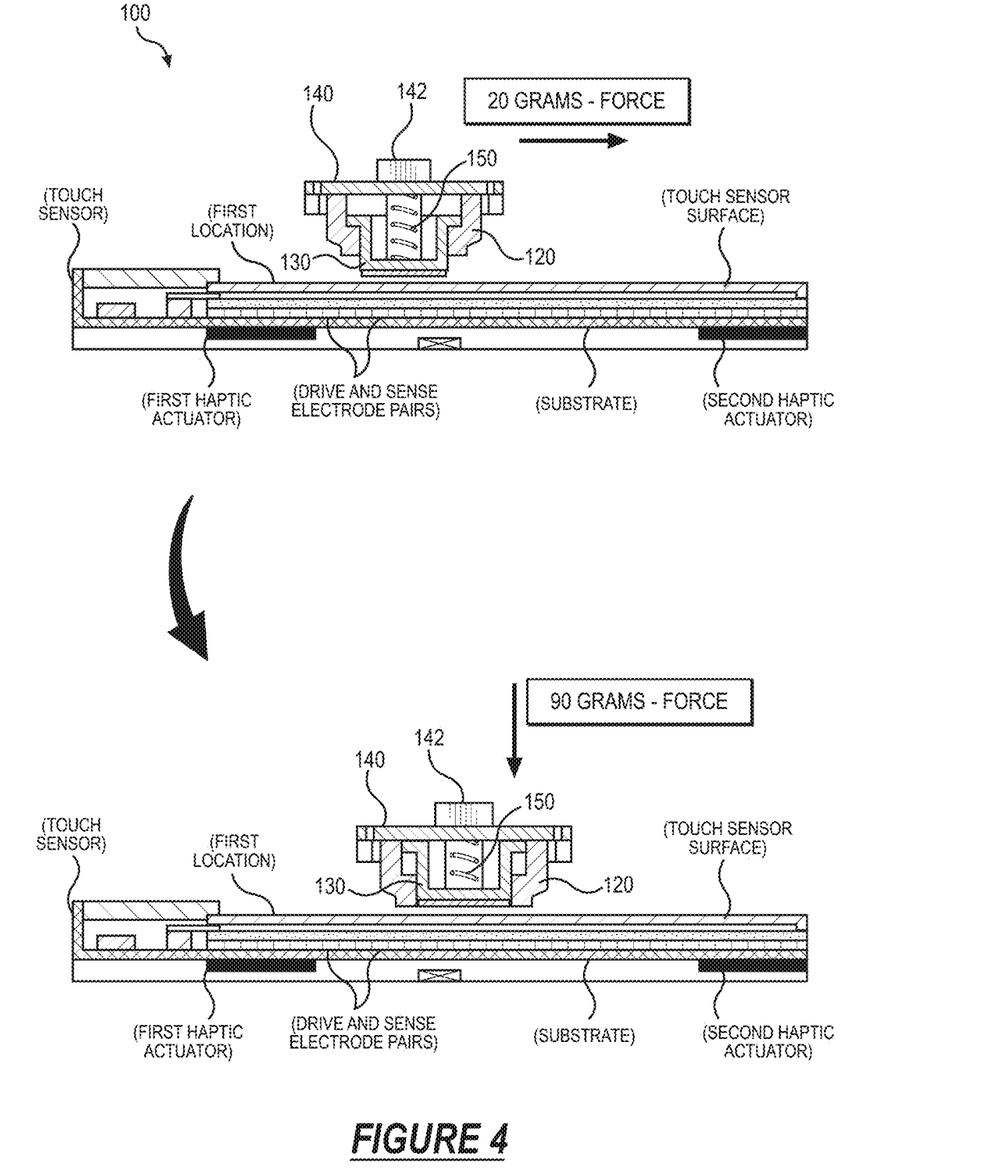
FIG. 4 is a schematic representation of the system.
Figure 5:
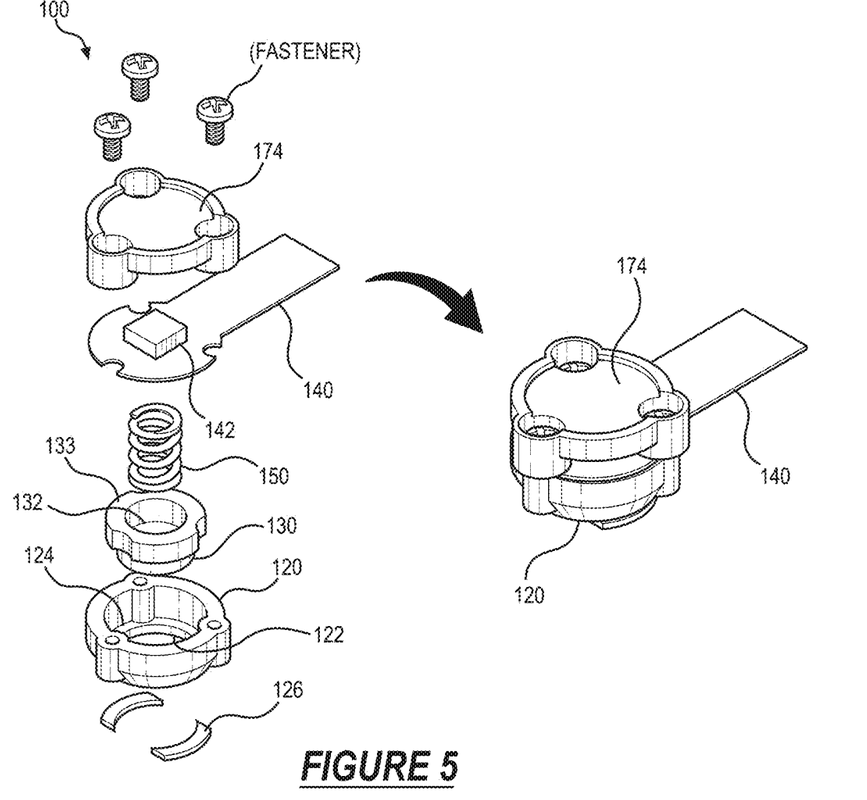
FIG. 5 is a schematic representation of the system.
Figure 6:
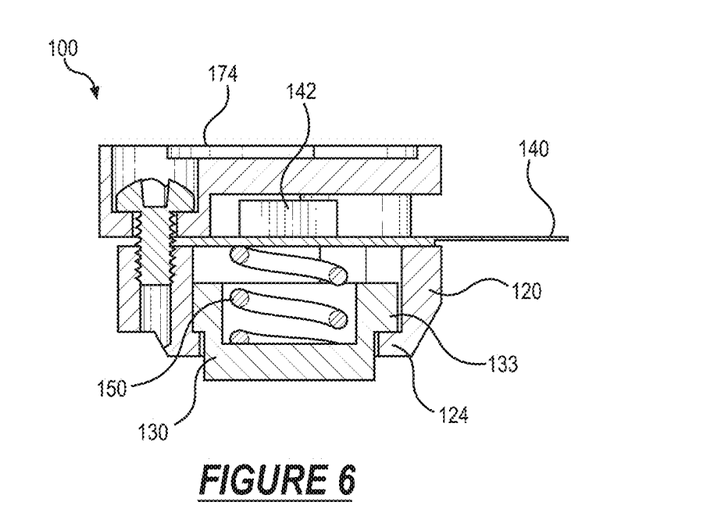
FIG. 6 is a schematic representation of the system.
Figure 7:
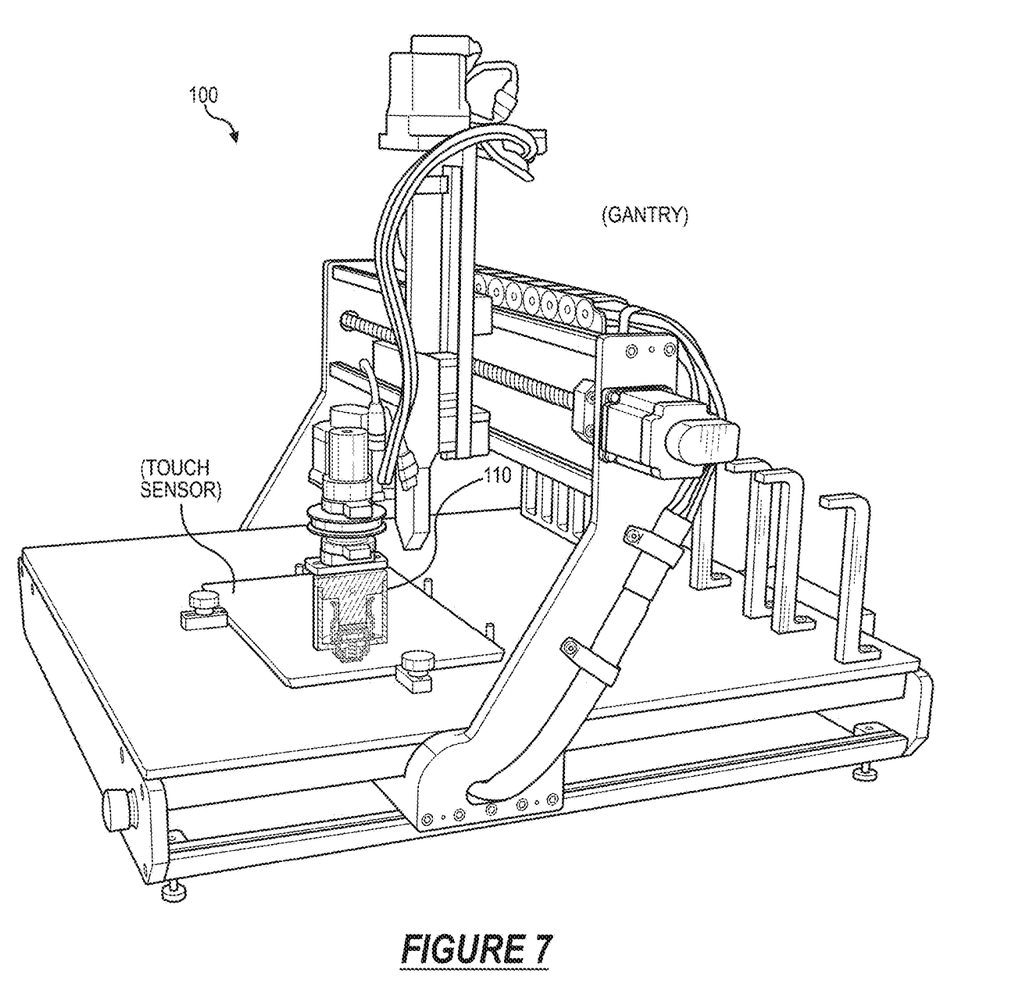
FIG. 7 is a schematic representation of the system.

As shown in FIG. 4, the touch sensor includes: a circuit board 140; a cover layer arranged above the circuit board 140 and defining a touch sensor surface; a touch sensor layer interposed between a top side of the circuit board 140 and the cover layer; a force sensor layer arranged below a bottom side of the circuit board 140; and a controller 190 configured to read electrical signals (e.g., voltages) from the touch sensor layer and the force sensor layer. The touch sensor layer includes a first array of drive and sense electrode pairs patterned across the touch sensor layer defining a touch input sensor. The force sensor layer includes a second array of drive and sense electrode pairs patterned across the force sensor layer defining a force input sensor.

In this configuration, application of a localized force to the touch sensor surface drives sense electrodes in the force sensor layer into contact with drive electrodes in the force sensor array to: reduce an electrode gap between sense electrodes and drive electrodes in the second array of drive and sense electrode pairs; increase capacitance across these drive and sense electrode pairs (e.g., manifesting as increased voltages at the sense electrodes when the drive electrodes are driven to a reference potential) as a function of (e.g., proportional to) the magnitude of the applied force.

Accordingly, the controller 190 is configured to: drive the first array of drive and sense electrode pairs (e.g., to a reference potential); read a first set of electrical values from the array of sense electrodes in the first array of drive and sense electrode pairs; and interpret a touch input applied at a particular location on the touch sensor surface based on differences between the first set of electrical values from baseline touch electrical values at the touch sensor. The controller 190 is also configured to: drive the second array set of drive and sense electrode pairs (e.g., to a reference potential); read a second set of electrical values from the array of sense electrodes in the second array of drive and sense electrode pairs; and interpret a force magnitude for the touch input applied at the particular location on the touch sensor surface based on differences between the second set of electrical values from baseline force electrical values at the touch sensor.

One variation of the touch sensor can also include: a haptic actuator (e.g., magnet+coil, LRA, piezo, ERM, solenoids) arranged below the circuit board 140; and configured to oscillate the touch sensor surface. Accordingly, the controller 190 is also configured to, in response to application of a target force magnitude (e.g., 200 gram-force) on the touch sensor surface, trigger the haptic actuator to oscillate the touch sensor surface of the touch sensor. In one example, the haptic actuator includes: a magnetic element arranged below the circuit board 140; and a set of inductor layers arranged within the circuit board 140 and defining a multi-layer inductor facing the magnetic element and configured to magnetically couple the magnetic element to oscillate the touch sensor surface. Accordingly, the system 100 can: apply a sequence of target force magnitudes (e.g., varying force magnitudes) at the touch sensor surface; induce haptic feedback responses (e.g., deep-click response, double click response, click response) at the touch sensor according to the applied target force magnitudes; and measure haptic feedback output from the touch sensor during execution of the haptic feedback cycles.

Thus, the system 100 can: receive a sequence of touch sensors, each capable of outputting variations of touch, force, and haptic response; and measure combinations of touch, force and/or haptics output at the sequence of touch sensors without changing tips at the system 100. For example, the system 100 can: measure touch output at a first touch sensor (e.g., touch only touch sensor) in the sequence of touch sensors; measure force inputs at a second touch sensor (e.g., force only touch sensor) in the sequence of touch sensors; measure touch+force outputs from a third touch sensor (e.g., touch and force only touch sensor) in the sequence of touch sensors; measure touch+haptics outputs at a fourth touch sensor (e.g., touch and haptics only touch sensor) in the sequence of touch sensors; and measure touch+force+haptic outputs from a fifth touch sensor in the sequence of touch sensors.

4. System

As shown in FIGS. 1 and 4, the system 100 includes: a controller 190; a touch sensor receptacle 132 configured to receive and locate the touch sensor; a probe; a tip assembly 110 coupled to a first end of the probe; a boom supporting the probe and configured to drive the tip assembly 110 at the probe toward the touch sensor surface of the touch sensor; an actuation subsystem 100 configured to scan the probe laterally and longitudinally across the touch sensor surface; and a force (or "pressure") sensor configured to detect a force magnitude of the probe applied normal to the touch sensor surface.

4.1 Measurement Tip Assembly

Generally, the system 100 includes a tip assembly 110 including: an outer tip 120; an inner tip 130 formed of a conductive material (e.g., copper) and nested within the outer tip 120; circuit board 140 including a vibration sensor 142 arranged over the outer tip 120 and the inner tip 130; and a spring element 150 arranged within the inner tip 130 and coupling the inner tip 130 to the circuit board 140. In particular the system 100 can: trigger the probe to apply the tip assembly 110—at a first target selection force (e.g., 10 gram-force-35 gram-force)—at a first region on the touch sensor surface to maintain the tip assembly 110 in a touch mode operation in which the inner tip 130 assembly 110 directly contacts the touch sensor surface; and/or trigger the probe to apply the tip assembly 110—at a second target selection force (e.g., 40 gram-force-200 gram-force) greater than the first target selection force—at the first region on the touch sensor surface to maintain the tip assembly 110 in a haptic mode operation in which the inner tip 130 and the outer tip 120 directly contact the touch sensor surface.

4.1.1 Inner Tip+Outer Tip

In one implementation, the system 100 includes a tip assembly 110: coupled to a distal end of the probe; and including an outer tip 120 and an inner tip 130. The outer tip 120: defines a first cavity within the outer tip 120; includes a flange arranged within the first cavity and radially extending within the first cavity; and defines an outer tip 120 contact surface (e.g., flat, circular contact surface) including an elastomeric material (e.g., rubber) approximately 9 millimeters-11 millimeters in diameter. The inner tip 130: is arranged within the first cavity of the outer tip 120; defines a second cavity within the inner tip 130; includes a ledge radially extending about a top end of the inner tip 130 and configured to rest on the flange of the first cavity when the inner tip 130 is nested within the outer tip 120; and defines an inner tip 130 contact surface (e.g., smooth, flat, circular contact surface) formed of a conductive material (e.g., copper) approximately 6 millimeters-8 millimeters in diameter.

In this implementation, the inner tip 130 is arranged within the outer tip 120 such that the inner tip 130 vertically translates within the outer tip 120; and is configured to, in response to application of a force at the inner tip 130 surface, locate the inner tip 130 surface flush with the outer tip 120 surface. Accordingly, the system 100 can: drive the probe to apply (e.g., drag) the inner tip 130 across regions of the touch sensor surface; and drive the probe—at a target selection force—to locate the inner tip 130 surface flush with the outer tip 120 surface at a particular region on the touch sensor surface. The elastomeric material at the outer tip 120 contact surface is configured to grip the touch sensor surface and prevent unwanted movement of the tip assembly 110 during a haptic feedback cycle at the touch sensor in order to transfer vibrations across the touch sensor surface through the outer tip 120 toward the vibration sensor 142.

4.1.2 Concentric Alignment

In one implementation, the tip assembly 110 includes the inner tip 130: arranged concentrically within a channel of the outer tip 120; vertically constrained within the channel (e.g., cylindrical channel) of the outer tip 120; and configured to vertically (e.g., linearly) translate within the channel of the outer tip 120 responsive to an applied force (e.g., 50 grams-force) at the inner tip 130. In this implementation, the inner tip 130 can include: a receptacle 132 (e.g., cylindrical reservoir) including a base 134 (e.g., circular base) that defines the inner contact surface 136; and a lip 133 (e.g., support structure) arranged (e.g., integrated) about a top end of the receptacle 132. For example, the receptacle 132 can: define cylindrical volume of a diameter that cooperates with a diameter of the channel of the outer tip 120; and includes a cylindrical base formed of a conductive material that defines a circular inner contact surface 136 that is concentric to the outer contact surface 126 of the outer tip 120.

Additionally, in this implementation, the outer tip 120 includes: the channel defining an inner wall (e.g., cylindrical inner wall) extending from the proximal end to the distal end of the outer tip 120; and a platform 124 (e.g., annular platform) arranged about the inner wall and configured to support (or "rest on") the lip 133 of the receptacle 132—of the inner tip 130—to concentrically locate the inner tip 130 within the channel of the outer tip 120. In particular, the lip 133 of the receptacle 132 is supported by (or "rests on") the platform 124 about the inner channel of the outer tip 120 to: locate the lip 133 of the receptacle 132 at an offset distance (e.g., 10 millimeters) from the proximal end of the outer tip 120; and locate the base 134 of the receptacle 132—and therefore the inner contact surface 136—extending from the aperture 122 arranged at the distal end of the outer tip 120. Thus, responsive to an applied force (e.g., 50 grams-force) at the base 134 of the inner tip 130, the inner tip 130 can: vertically translate within the channel toward the proximal end of the outer tip 120; and locate the inner contact surface 136 of the inner tip 130 coplanar with the outer contact surface 126 of the outer tip 120.

In one implementation, the tip assembly 110 can further include: a circuit board 140 arranged over the proximal end of the outer tip 120 to enclose the inner tip 130 within the outer tip 120; and a spring element 150 arranged within the receptacle 132 of the inner tip 130 and interposed between the base 134 of the receptacle 132 and a bottom side of the circuit board 140. For example, the spring element 150 can define a coiled metallic structure: vertically interposed between the base 134 of the receptacle 132 and the bottom side of the circuit board 140; including a first end configured to electrically couple the base 134—formed of a conductive material—of the receptacle 132 of the inner tip 130; and a second end, opposite the first end, coupled to a via on a bottom side of the circuit board 140. In this example, the inner tip 130 can further include: a guide ring 152 (e.g., annular structure) arranged within the receptacle 132; and configured to vertically constrain the spring element 150 within the receptacle 132 of the inner tip 130.

Accordingly, the spring element 150: forms an electrical connection (e.g., to virtual ground) between the inner tip 130 and the circuit board 140; and defines an uncompressed configuration, such as responsive to absence of an applied force at the inner tip 130, to locate the inner tip 130 extending from the distal end of the outer tip 120; and defines a compressed configuration, such as responsive to an applied force (e.g., 50 grams-force) at the inner tip 130, to vertically translate the inner tip 130 within the passage of the outer tip 120 and locate the inner contact surface 136 coplanar with the outer contact surface 126.

For example, the spring element 150 is configured to, in response to application of a first selection force (e.g., less than 50 grams-force) at the inner tip 130, yield to: offset the lip 133 of the receptacle 132 from the platform 124 to partially translate the conductive inner tip 130 within the outer tip 120; and locate the inner contact surface 136 of the conductive inner tip 130 vertically offset from the outer contact surface 126 of the outer tip 120. Therefore, in a first configuration (e.g., a touch mode), the tip assembly 110 can maintain the inner tip 130 vertically offset from the outer tip 120, thereby enabling the system 100 to navigate (e.g., drag) the inner tip 130 across a touch sensor surface of a touch sensor.

In another example, the spring element 150 is configured to, in response to application of a second selection force (e.g., greater than 50 grams-force), greater than the first selection force, yield to: offset the lip 133 of the receptacle 132 from the platform 124 to vertically translate the conductive inner tip 130 within the outer tip 120; couple the lip 133 of the receptacle 132 to a bottom side of the circuit board 140; and locate the inner contact surface 136 of the conductive inner tip 130 coplanar with the outer contact surface 126 of the outer tip 120. Therefore, in a second configuration (e.g., a haptics mode), the tip assembly 110 can maintain the inner tip 130 and the outer tip 120 along a single plane over the touch sensor surface, thereby enabling the system 100 to transfer vibrations across the touch sensor surface—such as during a haptic feedback cycle—to a vibration sensor 142 arranged on the circuit board 140.

4.1.3 Printed Circuit Board

In one implementation, the system 100 includes a circuit board 140 (e.g., flexible substrate, rigid multi-layer substrate): coupled to the inner tip 130 and the outer tip 120; and including a vibration sensor 142 arranged over the inner tip 130 and the outer tip 120 and configured to detect haptic intensities applied at the inner tip 130 and the outer tip 120.

During operation, the touch sensor can trigger a haptic feedback cycle at the touch sensor surface—in direct contact with the outer tip 120 and the inner tip 130—and thus transfer haptic intensities from the contact surface to the vibration sensor 142 at the circuit board 140. In this implementation, the system 100 includes the circuit board 140 coupled to the controller 190 and can thus retrieve haptic intensities recorded at the vibration sensor 142.

Figure 3:
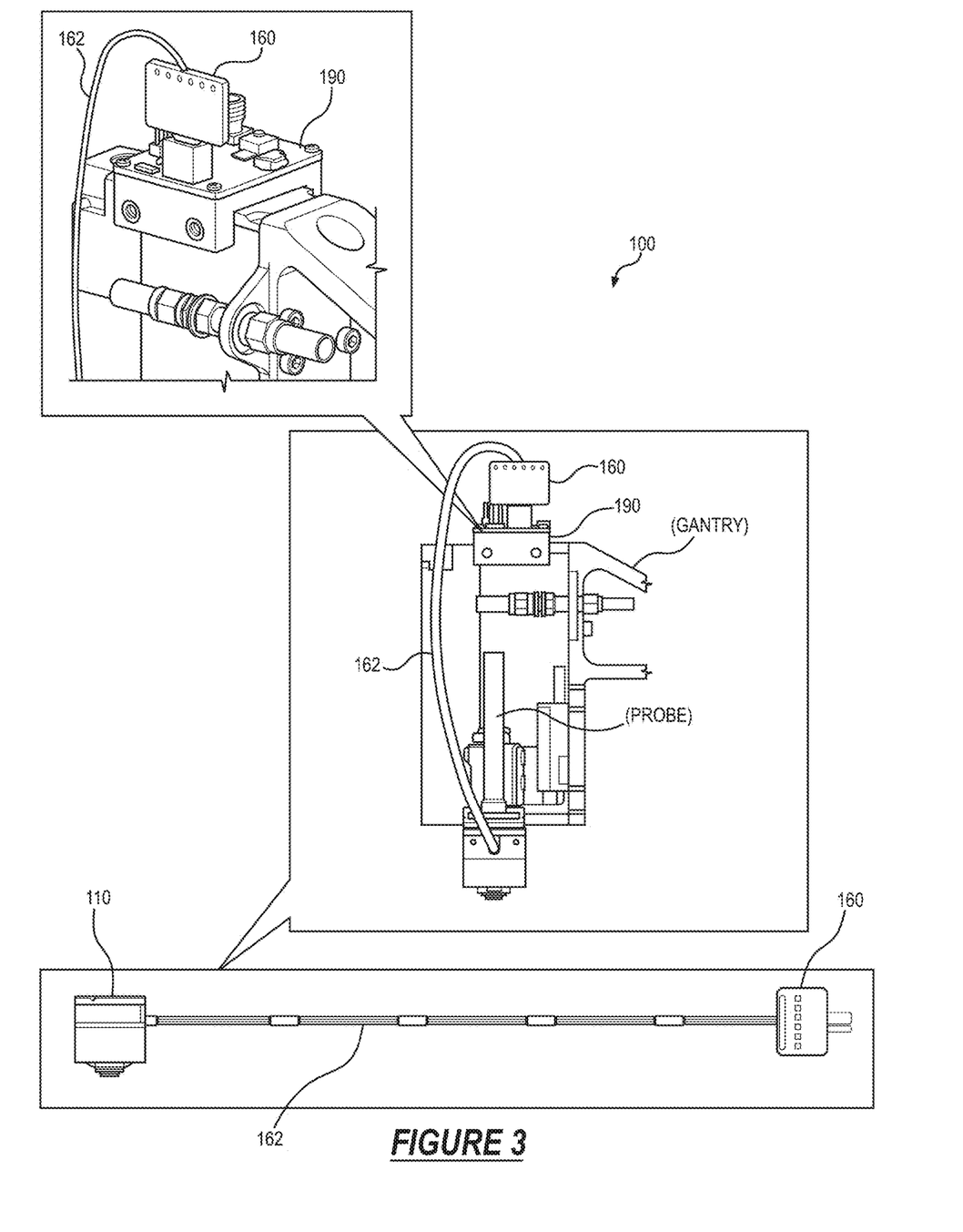
FIG. 3 is a schematic representation of the system.

For example, the system 100 can include a wired connection between the circuit board 140 and the controller 190. In another example, shown in FIG. 3, the system 100 includes the circuit board 140 including a tail extending from the tip assembly 110 and connected to the outer tip 120 the controller 190.

Additionally, the system 100: includes the circuit board 140 coupled (i.e., electrically coupled) to the conductive material at the inner tip 130; and is configured to transmit electrical signals (e.g., voltage signals) to the inner tip 130 in order to generate a charged surface across the inner tip 130 contact surface. Accordingly, the system 100 can also couple the inner tip 130 to a reference potential (e.g., virtual ground) in order to cease the charged surface across the inner tip 130 contact surface. Thus, the system 100 can selectively engage the inner tip 130 in a charged mode or a neutral mode during a measurement routine.

In one example, the system 100: includes the circuit board 140 directly coupled to the inner tip 130, such as coupled via wires to the inner tip 130 and/or coupled to the inner tip 130 via the spring element 150 arranged within the inner tip 130; and can couple the inner tip 130 (e.g., via the controller 190 module) to the reference potential (e.g., virtual ground) via wired connection of the circuit board 140 to the inner tip 130.

In another example, the system 100: includes the circuit board 140 directly coupled to the inner tip 130, such as coupled via wires to the inner tip 130 and/or coupled to the inner tip 130 via the spring element 150 arranged within the inner tip 130; includes a bottom side of the circuit board 140 including a conductive surface coupled to a virtual ground; and is configured to couple (e.g., directly contact) the top end of the inner tip 130 responsive to application of a force at the inner tip 130 resulting in vertical translation of the inner tip 130 toward the bottom side of the circuit board 140.

Accordingly, the system 100 can: drive an electrical signal (e.g., voltage signal) across the inner tip 130 to induce a charged surface across the inner tip 130 contact surface, thus affecting electrical values across the touch sensor layer at the touch sensor; couple the inner tip 130 to a virtual ground to discontinue (or "cut off") the charged surface across the inner tip 130 contact surface; read a set of vibration intensities from the vibration sensor 142; and generate a vibration image representing haptic intensities at a particular region on the touch sensor surface based on the set of vibration intensities.

4.1.4 Spring Element

In one implementation, the system 100 includes the spring element 150 (e.g., spiral metallic structure): vertically arranged within the second cavity of the inner tip 130; defining a bottom end coupled to a bottom end of the probe; and defining a top end coupled to the bottom surface of the circuit board 140. In this implementation, the spring element 150: locates the inner tip 130 at a vertical offset from the outer tip 120 (i.e., maintains the inner tip 130 protruding outwardly from the outer tip 120); and is configured to, responsive to application of a force at the inner tip 130, vertically translate the inner tip 130 within the outer tip 120, thus reducing an offset distance between the inner tip 130 contact surface and the outer tip 120 contact surface.

Accordingly, the system 100 includes the spring element 150 formed at a target stiffness (e.g., spring constant) to define a first target force threshold (e.g., 40 gram-force-50 gram-force) configured to: locate the inner tip 130 vertically offset from the outer tip 120 (i.e., the inner tip 130 protruding outwardly from the outer tip 120) responsive to application of a force below the first target force threshold; and compress the spring element 150—thus translating the inner tip 130 within the outer tip 120—to locate the inner tip 130 contact surface flush with the outer tip 120 contact surface responsive to application of a force above the first target force threshold. Thus, the system 100 can: drive the probe at a first target selection force, less than the target force threshold, to apply the inner tip 130 at a particular region on the touch sensor surface of the touch sensor; and drive the probe at a second target selection force, greater than the target force threshold, to apply the inner tip 130 and the outer tip 120 at the particular region on the touch sensor surface.

For example, the system 100 can: trigger the probe to apply the tip assembly 110—at a first target selection force (e.g., 10 gram-force-35 gram-force)—to a particular region at the touch sensor surface such that the inner tip 130 protrudes outwardly from the outer tip 120 and thus remains in direct contact with the touch sensor surface; and trigger the probe to apply the tip assembly 110—at a second target selection force (e.g., 40 gram-force-200 gram-force) greater than the first target selection force—to the particular region at the touch sensor surface such that the inner tip 130 vertically translates within the outer tip 120 to locate the inner tip 130 contact surface flush with the outer tip 120 contact surface at the particular region.

Therefore, the system 100 can: operate the tip assembly 110 in a touch mode in which the inner tip 130 directly contacts the touch sensor surface of the touch sensor during a first time period in a measurement routine; or operate the tip assembly 110 in a haptic mode in which both the inner tip 130 and the outer tip 120 directly contact the touch sensor surface of the touch sensor during a second time period in the measurement routine.

In another implementation, the spring element 150 includes a foam material (e.g., conductive foam material): interposed between the base 134 of the inner tip 130 and the circuit board 140; and configured to yield (e.g., compress) to translate the inner tip 130 within the outer tip 120 responsive to an applied force at the inner tip 130; and electrically coupling the inner tip 130 to the circuit board 140.

In one variation, the tip assembly 100 includes: the spring element 150 formed of a non-conductive material; and the inner contact surface 136 can be formed of a conductive material (e.g., copper) externally connected to a reference potential.

4.1.5 Vibration Sensor

In one implementation, the system 100 includes a vibration sensor 142 (e.g., an accelerometer): arranged on the circuit board 140 coupled to the proximal end of the outer tip 120; and configured to detect vibrations from the outer tip 120 and the inner tip 130 arranged within the outer tip 120. For example, the vibration sensor 142 can define a multi-dimensional accelerometer configured to detect vibrations: horizontal to a vibration plane (e.g., X, Y plane) at the distal end of the outer tip 120; and vertical to the vibration plane (e.g., Z-axis) at the distal end of the outer tip 120.

In this implementation, the outer tip 120 can include: a first support region arranged at the proximal end of the outer tip 120; a second support region, opposite the first support region, arranged at the proximal end of the outer tip 120; and the channel interposed between the first support region and the second support region. Additionally, the circuit board 140 can include: a first board section extending over (or "supported by") the first support region of the outer tip 120; and a second board section, opposite the first board section, extending over (or "supported by") the second support region of the outer tip 120. In one example, the tip assembly 110 can include: a first fastener coupling the first board section of the circuit board 140 to the first support region of the outer tip 120; and a second fastener coupling the second board section of the circuit board 140 to the second support region of the outer tip 120.

The circuit board 140 also includes a center board section: interposed between the first board section and the second board section; and extending over the channel of the outer tip 120 to enclose the conductive inner tip 130 within the outer tip 120. In this implementation, the vibration sensor 142: is arranged on the center board section of the circuit board 140; and is configured to detect vibration signals transferred from the outer tip 120 and the inner tip 130. More specifically, the vibration sensor 142 is configured to detect vibration signals: transferred from the conductive inner tip 130 to the center board section of the circuit board 140; and transferred from the outer tip 120 to the first board section and the second board section of the circuit board 140.

Accordingly, in response to application of the inner tip 130 toward the touch sensor surface of the touch sensor at the second selection force (e.g., greater than 50 grams-force), the tip assembly 110 is configured to: vertically translate the inner tip 130 within the outer tip 120 to couple the center board section of the circuit board 140; and couple the outer contact surface 126 and the inner contact surface 136 to the touch sensor surface of the touch sensor. Therefore, during a haptic feedback cycle at the touch sensor to oscillate the touch sensor surface, vibrations across the touch sensor surface are transferred across the outer tip 120 and inner tip 130 toward the vibration sensor 142 arranged on the circuit board 140.

4.1.6 Enclosure+Probe Coupling

In one implementation, the system 100 includes: the tip assembly 110 coupled to a distal end of the probe; and a spacer interposed between the tip assembly 110 and the distal end of the probe. In this implementation, the spacer: is formed of a compressible material (e.g., gel, silicone); and is configured to deflect (or "compress") responsive to application of haptic intensities at the inner tip 130 contact surface and the outer tip 120 contact surface of the tip assembly 110.

Thus, the system 100 can: drive the probe—at a first selection force greater than the target force threshold—to apply the tip assembly 110 at a first region on the touch sensor surface in order to trigger a haptic feedback cycle at the touch sensor; transfer haptic intensities applied at the tip assembly 110 toward the spacer, thus enabling the tip assembly 110 to freely oscillate during the haptic feedback cycle; and read a set of haptic feedback intensities from the vibration sensor 142 during the haptic feedback cycle.

Additionally or alternatively, the system 100 can include a clamp coupling the tip assembly 110 to the distal end of the probe.

In one implementation, the system 100 further includes: an interface 170 configured to couple a distal end of a probe; and an enclosure 172 coupled to the interface 170 (e.g., via fasteners) and containing the tip assembly 110. In this implementation, the tip assembly 110: is partially contained within the enclosure 172; and includes the outer tip 120 and the inner tip 130 extending from a bottom end of the enclosure 172. The tip assembly 110 further includes: a top cover 174 arranged over the circuit board 140 and the vibration sensor 142; and a spacer element 176 interposed between the interface 170 and the top cover 174 of the tip assembly 110 and configured to dampen vibrations transferred from the interface 170 to the vibration sensor 142. Therefore, the tip assembly 110 can: dampen external vibrations, such as from navigating the tip assembly 110 across the touch sensor surface of the touch sensor via the probe; and isolate vibrations across the touch sensor surface, such as during a haptic feedback cycle, transferred to the vibration sensor 142 across the outer tip 120 and the inner tip 130.

4.1.7 Contact Surface+Touch Sensor Surface

In one implementation, the outer contact surface 126: defines an annular contact surface about a tip axis at the distal end of the outer tip 120; and is formed of an elastomeric material (e.g., rubber) configured to maintain contact with the touch sensor surface of the touch sensor during a haptic feedback cycle. Additionally, the inner contact surface 136: defines a circular contact surface concentrically aligned within the annular contact surface of the outer tip 120; and is formed of a smooth conductive material (e.g., copper) configured to effect electrical values across drive and sense electrode pairs at the touch sensor.

During application of the tip assembly 110—in the touch mode configuration—toward the touch sensor surface of the touch sensor at the first selection force, the smooth conductive material couples the touch sensor surface at the first selection force. The touch sensor can then capture a touch image representing detected force magnitudes across the touch sensor surface during application of the inner tip 130 across the touch sensor surface at the first selection force. Alternatively, during application of the tip assembly 110—in the haptic mode configuration—toward the touch sensor surface of the touch sensor at the second selection force, the elastomeric material couples the touch sensor surface at the second selection force and therefore prevents the tip assembly 110 from sliding across the touch sensor surface during a haptic feedback cycle oscillating the touch sensor surface. The system 100 can then, during the haptic feedback cycle, capture a first haptic waveform from the vibration sensor 142 representing detected vibrations (e.g., peak-to-peak vibrations) across the touch sensor surface during the haptic feedback cycle.

In one example, the inner contact surface 136 defines a smooth conductive surface (e.g., copper) configured to effect electrical values across drive and sense electrode pairs at the touch sensor. Additionally, the outer contact surface 126 defines an elastomeric surface (e.g., rubber) configured to, during a haptic feedback cycle at a touch sensor, grip the touch sensor surface of the touch sensor. Accordingly, the tip assembly 110 is operable in the touch configuration, during application of the inner tip 130 toward the touch sensor surface of the touch sensor at the first selection force: including the smooth conductive surface vertically offset from the elastomeric surface; and configured to effect electrical values across the drive and sense electrode pairs at the touch sensor during coupling of the smooth conductive surface to the touch sensor surface. Furthermore, the tip assembly 110 is operable in the haptic configuration, during the haptic feedback cycle at the touch sensor in response to application of the conductive inner tip 130 toward the touch sensor surface at the second selection force: including the smooth conductive surface coplanar with the elastomeric surface; and configured to transfer vibrations across the touch sensor surface to the vibration sensor 142 during coupling of the smooth conductive surface and the elastomeric surface to the touch sensor surface.

Therefore, the tip assembly 110 can concurrently: contact the touch sensor surface of the touch sensor to effect electrical values across drive and sense electrode pairs at the touch sensor; and contact the touch sensor surface to transfer vibrations across the touch sensor surface to the vibration sensor 142.

In one variation, the inner contact surface 136 defines a foam material (e.g., perforated foam) configured to contact the touch sensor surface of the touch sensor to effect electrical values across an array of force sensors (e.g., capacitive force sensors) in the touch sensor. Additionally, as described above, the outer contact surface 126 defines an elastomeric surface (e.g., rubber) configured to, during a haptic feedback cycle at the touch sensor, grip the touch sensor surface of the touch sensor. In this variation, the inner tip 130 can be formed of a non-conductive material and the system can implement the tip assembly 110 during a force and haptics measurement routine for a touch sensor.

4.2 Controller Operation

In one implementation, the system 100 can via a controller 190 (e.g., driver, computer system 100) execute a measurement routine to: maneuver (e.g., drag) the tip assembly 110 about a sequence of locations across the touch sensor surface of the touch sensor in a touch mode operation; and drive the probe—and thus the tip assembly 110—at a target selection force greater than the target force threshold at a target location on the touch sensor surface in a haptic mode operation in order to trigger a haptic feedback cycle at the touch sensor during the measurement routine. Thus, during a single measurement routine, the system 100 can transition between: operation of the tip assembly 110 in touch mode in which the inner tip 130 is applied to the touch sensor surface, thus affecting electrical values across the touch sensor layer and the force sensor layer at the touch sensor; and operation of the tip assembly 110 in haptic mode in which each of the inner tip 130 and the outer tip 120 are in contact with the touch sensor surface in order to trigger a haptic feedback cycle at the touch sensor responsive to application of a target force magnitude at the touch sensor surface.

In one implementation, during a first time period in the measurement routine corresponding to operation of the tip assembly 110 in touch mode, the system 100 can: drive an electrical signal (e.g., voltage signal) across the inner tip 130 to generate an electrical charge across the inner tip 130 contact surface; drive the probe, at a first target selection force less than a target force threshold, to apply the inner tip 130 at a particular region of the touch sensor surface and thus affect electrical values across the touch sensor layer and the force sensor layer at the touch sensor; and maneuver (e.g., drag) the inner tip 130 across a first sequence of locations at the particular region of the touch sensor surface.

In the aforementioned implementation, during a second time period following the first time period in the measurement routine corresponding to operation of the tip assembly 110 in haptic mode, the system 100 can: maneuver the probe to locate the tip assembly 110 at a target location on the particular region of the touch sensor surface; couple the inner tip 130 to a reference potential (e.g., virtual ground) to cease electrical charge across the inner tip 130 contact surface; and drive the probe, at a second target selection force greater than the target selection force, to vertically translate the inner tip 130 within the outer tip 120 and thus apply each of the inner tip 130 and the outer tip 120 to the target location at the touch sensor surface and trigger a haptic feedback cycle at the touch sensor.

In one implementation, the system can: generate an identification tag corresponding to a particular tip assembly 110 implemented by the system; and assign the identification tag to the tip assembly 110; and track measurement routines, associated with the identification tag, executed by the system with the tip assembly 110 across multiple touch sensor units. In one example, in response to a quantity of measurement routines exceeding a threshold quantity (e.g., 1000 measurement cycles), the system can flag the identification tag associated with the tip assembly 110 for manual review by an operator.

4.2.1 Wired Connection

In one implementation, the system 100 includes: the controller 190 arranged separate from the tip assembly 110, such as coupled to a boom supporting the probe and the tip assembly 110; and a connector 160 extending from the tip assembly 110 and configured to electronically couple the controller 190 to enable the controller 190 to read vibration signals from the vibration sensor 142 at the tip assembly 110.

For example, the controller 190 can include a female connector configured to receive a male connector 160 extending from the tip assembly 110. In this example, the male connector 160 includes: a connector circuit board including a set of connector pads configured to electronically couple to the female connector at the controller 190; and a set of wires 162 extending from the set of connector pads on the connector circuit board and coupled (e.g., soldered) to the circuit board 140 arranged over the outer tip 120. More specifically, the set of wires 162 can include: a first wire connected to a first output (e.g., X-axis vibration signal output) of the vibration sensor 142; a second wire connected to a second output (e.g., Y-axis vibration signal output) of the vibration sensor 142; and a third wire connected to a third output (e.g., Z-axis vibration signal output) of the vibration sensor 142. Additionally, the set of wires 162 can include: a fourth wire configured to supply power to the circuit board 140; a fifth wire connecting the vibration sensor 142 to a virtual ground; and a sixth wire connecting the inner tip 130 to a reference potential.

In this example, the system 100 further includes a wire clamp 179: interposed between the interface 170 and the enclosure 172 containing the tip assembly 110; and configured to lead the set of wires 162 from the circuit board 140 outwardly from the enclosure 172. Therefore, the system 100 can include: the controller 190 arranged separate from the tip assembly 110; a tip assembly 110 arranged (e.g., coupled) to a probe; and a connector 160 coupling the controller 190 to the tip assembly 110.

5. Measurement Routine

During a calibration routine, once the touch sensor is loaded into the receptacle 132, the controller 190 can retrieve a target selection force—from a set of target selection forces—assigned for the touch sensor surface, such as a first target selection force below the target selection force to calibrate touch inputs applied across the touch sensor surface and/or a second target selection force greater than the target selection force to calibrate (or "tune") the touch sensor to detect "click" inputs of force magnitudes greater than this target force threshold across the touch sensor surface and to respond accordingly (e.g., by vibrating the touch sensor during a haptic feedback cycle). The controller 190 can also load a calibration path for the touch sensor, such as a preplanned serpentine or boustrophedonic path defining linear path sections offset according to a target calibration resolution (e.g., 10% of the total width of the touch sensor surface) and inset from the perimeter of the touch sensor surface (e.g., by 5% of the width of the touch sensor surface to produce nine parallel and offset linear path sections of the calibration path).

In one implementation, the system 100 can execute a single calibration routine to generate: a response map representing touch, force, and haptic output at the touch sensor; calibrate input force thresholds across an area of the touch sensor based on the response map and thus compensate for manufacturing variance and manufacturing defects within the touch sensor in order to enable more accurate and repeatable detection and responses to inputs across the touch sensor surface as a function of applied force; and calibrate haptic feedback response across regions of a touch sensor surface based on the response map and thus compensate for haptic signal interference across the touch sensor surface generated during concurrent actuation of two or more haptic feedback modules.

For example, during a first time period in the calibration routine, the system 100 can: drive an electrical signal (e.g., voltage signal) across the inner tip 130 to electrically charge the inner tip 130 contact surface; drive the probe, at a first target selection force less than a target force threshold, to apply the inner tip 130 at a particular region of the touch sensor surface and thus affect electrical values across the touch sensor layer and the force sensor layer at the touch sensor; and maneuver (e.g., drag) the inner tip 130 across a first sequence of locations at the particular region of the touch sensor surface.

Accordingly, the touch sensor can then capture a sequence of touch images representing: magnitudes of touch inputs detected on the touch sensor surface during the calibration routine; and magnitudes of forces detected on the touch sensor surface during the calibration routine. The touch sensor can then, responsive to completion of applying the tip assembly 110 across the sequence of locations at the touch sensor surface, transmit (e.g., wirelessly) the sequence of touch images to the system 100. Furthermore, the system 100 can then: store the sequence of touch images within local memory; and retrieve the sequence of touch images from local memory to derive a response map.

In this example, during a second time period in the calibration routine, the system 100 can, in response to completion of application of the tip assembly 110 across the sequence of locations: couple the inner tip 130 to a reference potential (e.g., virtual ground) to cease electrical charge across the inner tip 130 contact surface; and drive the probe, at a second target selection force greater than the target selection force, to vertically translate the inner tip 130 within the outer tip 120 and thus apply each of the inner tip 130 and the outer tip 120 to a final location—in the sequence of locations—at the touch sensor surface.

Accordingly, the touch sensor can then: read a set of electrical values from the second array of drive and sense electrode pairs in the force sensor layer; interpret a force magnitude for the tip assembly 110 applied at the final location on the touch sensor surface; and, in response to application of a target force magnitude, trigger a haptic feedback cycle to oscillate the touch sensor surface.

The system 100 can then: read a set of haptic feedback intensities from the vibration sensor 142 within the tip assembly 110 during the haptic feedback cycle; and generate a vibration image based on the set of haptic feedback intensities representing haptic response induced at the final location on the touch sensor surface during the haptic feedback cycle.

Therefore, the system 100 can: fuse the sequence of touch images and the vibration images into a response map; and store the response map in local memory of the system 100.

5.1 Measurement Routine: Interleaved Force+Haptics Testing

In one implementation, the system 100 can execute a single calibration routine to: generate a response map representing touch, force, and haptic output at a target location on the touch sensor surface of the touch sensor; calibrate input force thresholds at the target location on the touch sensor surface based on the response map; and calibrate haptic feedback response at the target location of the touch sensor surface based on the response map.

For example, the system 100 can drive the probe, at a first target selection force less than a target force threshold, to apply the inner tip 130 at the target location on the touch sensor surface and thus affect electrical values across the touch sensor layer and the force sensor layer at the touch sensor. Accordingly, the touch sensor can then capture a touch image representing: magnitudes of touch inputs detected on the touch sensor surface during the calibration routine; and magnitudes of forces detected on the touch sensor surface during the calibration routine.

Furthermore, the system 100 can then: couple the inner tip 130 to a reference potential (e.g., virtual ground); and drive the probe at a second target selection force, greater than the target selection force, to vertically translate the inner tip 130 within the outer tip 120 and thus apply each of the inner tip 130 and the outer tip 120 to the target location at the touch sensor surface. Accordingly, the touch sensor can then: read a set of electrical values from the second array of drive and sense electrode pairs in the force sensor layer; interpret a force magnitude for the tip assembly 110 applied at the target location on the touch sensor surface; and, in response to application of a target force magnitude, trigger a haptic feedback cycle to oscillate the touch sensor surface. The system 100 can then: read a set of haptic feedback intensities from the vibration sensor 142 within the tip assembly 110 during the haptic feedback cycle; and generate a vibration image based on the set of haptic feedback intensities representing haptic response induced at the target location on the touch sensor surface during the haptic feedback cycle Therefore, the system 100 can fuse the touch image and the vibration image into a response map representing touch, force, and haptic output at the target location on the touch sensor surface thereby reducing passes of the tip assembly 110 across the same locations on the touch sensor surface during the calibration routine.

5.2 Measurement Routine: Localized Touch+Haptic Measurement

In one implementation, the system 100 can: apply the tip assembly 110, in the touch configuration, to a target location on the touch sensor surface at the first selection force to detect touch inputs across the touch sensor surface at the touch sensor; and apply the tip assembly 110, in the haptic configuration, to the target location on the touch sensor surface at the second selection force to detect vibrations across the touch sensor surface during a haptic feedback cycle at the touch sensor. Accordingly, the system 100 can then: retrieve touch data from the touch sensor during application of the tip assembly 110, in the touch configuration, on the touch sensor surface; retrieve vibration data from the vibration sensor 142 during the haptic feedback cycle; and fuse the touch data and the vibration data to generate a response map corresponding to touch, force, and haptics response at the first location of the touch sensor surface.

For example, the system 100 can, at a first time: apply the tip assembly 110, in the touch configuration, to a target location on the touch sensor surface at the first selection force (e.g., 20 grams-force); and access a first touch image from the touch sensor representing a magnitude of force detected on the touch sensor surface by the touch sensor responsive to application of the first selection force on the touch sensor surface. Additionally, at a second time following the first time, the system 100 can: apply the tip assembly 110, in the haptics configuration, to the target location on the touch sensor surface at the second selection force (e.g., 80 grams-force); trigger a haptic feedback cycle at the touch sensor to oscillate the touch sensor surface; and capture a first haptic waveform from the vibration sensor 142 representing detected vibrations at the target location on the touch sensor surface during the haptic feedback cycle. The system 100 can then: repeat the steps described above for a set of keypoints across the touch sensor surface to retrieve a set of touch images and a set of haptic waveforms corresponding to the set of keypoints on the touch sensor surface; and compile the set of touch images and the set of haptic waveforms into a response map representing touch, force, and haptics response across the touch sensor surface.

Therefore, rather than sequentially executing a first measurement routine to measure touch response at the touch sensor and a second measurement routine to measure haptics response at the touch sensor, the system 100 can concurrently measure touch and haptics response at the touch sensor during a single measurement routine.

5.3 Measurement Routine: Haptic Keypoints+Measurement Path

In one implementation, the system 100 can: during a first time period, apply (e.g., drag) the tip assembly 110, in the touch configuration, along a measurement path on the touch sensor surface at the first selection force to detect touch inputs across the touch sensor surface at the touch sensor; and, during a second time period following the first time period, apply (e.g., couple) the tip assembly 110, in the haptics configuration, across a set of keypoints on the touch sensor surface at the second selection force to detect vibrations across the touch sensor surface during a haptic feedback cycle at the touch sensor. The system 100 can then, during the first time period: retrieve a sequence of touch images representing magnitudes of forces detected on the touch sensor surface by the touch sensor; and fuse the sequence of touch images into a touch response map representing magnitudes of forces detected on the touch sensor surface by the touch sensor responsive to application of the first selection force along the measurement path on the touch sensor surface. Additionally, during the second time period, the system 100 can: access a set of haptic waveforms captured by the vibration sensor 142 representing vibrations detected on the touch sensor surface; and fuse the set of haptic waveforms into a haptic response map representing haptic intensities detected on the touch sensor responsive to application of the second selection force on the touch sensor surface.

Therefore, rather than relying on manual changing of the tip assembly 110, the system 100 can include a singular tip configured to transition between a touch measurement routine and a haptics measurement routine for the touch sensor.

5.4 Force Compensation Map

In one implementation, such as described in U.S. Non-Provisional application Ser. No. 18/200,304, the touch sensor can: interpret force magnitudes (or representative values, such as sense electrode voltage or force-sensitive layer contact resistance) detected by drive electrode and sense electrode pairs in the sensor array that correspond to application of the target selection force at corresponding (e.g., adjacent, cospatial) locations on the touch sensor surface; and store these force magnitudes as threshold forces for detecting inputs at the target selection force at corresponding locations across the touch sensor surface, as shown in FIGS. 1 and 4B.

For example, the touch sensor can: implement a common, fixed force model to transform resistance or voltage values read from the drive electrode and sense electrode pairs during scan cycles, within the calibration routine, into force magnitudes carried into these drive electrode and sense electrode pairs during these scan cycles; store these force magnitudes in touch images; compile these force-based touch images into a force-based response map; and directly store this force-based response map as the force compensation map such that the force compensation map defines uncorrected force magnitudes that correspond to application of the target selection force at discrete locations across the touch sensor surface.

Alternatively, the touch sensor can: calculate a force offset, a scalar (i.e., linear) force correction function, or a nonlinear force correction function to convert the detected force magnitude of an input at a location on the touch sensor surface to a calibrated (or "true") force magnitude based on the response map; write this force offset, scalar (i.e., linear) force correction function, or a nonlinear force correction function to a corresponding pixel or region of the force compensation map; and repeat this process for other pixels or regions represented in the response map, as described below.

In a similar example, during a scan cycle, the touch sensor can: drive a set of drive electrodes in the touch sensor to a reference voltage; read a set of sense voltages from a set of sense electrodes in the touch sensor, wherein each sense electrode passes a voltage proportional to the reference voltage and a local contact resistance of the force-sensitive layer against the sense electrode, and wherein the force-sensitive layer exhibits changes in local contact resistance against the sense electrode as a function of force applied to the touch sensor surface; and then compile the set of sense voltages into a touch image for the scan cycle. In this example, the touch sensor can then represent magnitudes of voltages passed by the set of sense electrodes—responsive to application of the target selection force on the touch sensor surface by the probe during the calibration routine—in pixels representing corresponding drive electrode and sense electrode pairs in a response map. The touch sensor can then generate a force compensation map that defines magnitudes of voltages—carried over from the response map—as threshold voltages for detecting inputs of force magnitudes greater than the target selection at corresponding locations on the touch sensor surface. More specifically, in this example, the touch sensor can: generate a voltage-based response map; and directly store this voltage-based response map as the force compensation map such that the force compensation map defines uncorrected voltage magnitudes that correspond to application of the target selection force at discrete locations across the touch sensor surface.

Alternatively, the touch sensor can: calculate a voltage offset, a scalar (i.e., linear) voltage correction function, or a nonlinear voltage correction function to convert the detected voltage of an input at a location on the touch sensor surface to a calibrated (or "true") voltage based on the response map; write this voltage offset, scalar (i.e., linear) voltage correction function, or nonlinear voltage correction function to a corresponding pixel or region of the force compensation map; and repeat this process for other pixels or regions represented in the response map, as described below.

(Additionally or alternatively, the touch sensor can: store these voltage offsets, scalar (i.e., linear) voltage correction functions, or nonlinear voltage correction functions in a point cloud or other, more compact data container; and recall all or parts of this point cloud other data container to correct force magnitudes of inputs on the touch sensor surface during operation.)

5.5 Haptic Output Calibration

In one implementation, such as described in U.S. Non-Provisional application Ser. No. 18/141,317, the touch sensor is configured to receive controlled input forces of a predefined magnitude (e.g., fixed calibration magnitude) over a set of discrete locations on the touch sensor surface during a calibration cycle. Concurrent with each application of the calibration force, the controller 190 within the touch sensor can trigger a sequence of vibration cycles for the first haptic feedback module to oscillate the touch sensor surface. The sequence of vibration cycles defines a sequence of oscillating voltage cycles containing instructions for voltage amplitude, phase off-set, and time duration for the voltage cycle delivered to the haptic feedback module. The touch system 100 can then sample haptic feedback intensity (e.g., waveforms, peak to peak accelerations, acoustics) for the discrete regions on the touch sensor surface in order to observe how each vibration cycle in the sequence of vibration cycles oscillates the touch sensor surface on a particular discrete region. For example, for a particular region on the touch sensor surface, the sequence of vibration cycles can increment voltage amplitudes following each cycle to observe how varying amplitudes oscillate the touch sensor surface on a particular discrete region.

The controller 190 can interpret a maximum haptic feedback intensity (e.g., maximum peak to peak acceleration) and a minimum haptic feedback intensity (e.g., minimum peak to peak acceleration) for a particular region on the touch sensor surface based on the sampled set of haptic feedback intensities for the particular calibration region. Furthermore, the controller 190 can select the target haptic intensity based on a desired haptic feedback intensity for the calibration region. For example, to increase haptic feedback intensities across all calibration regions on the touch sensor surface, the controller 190 can select a target haptic feedback intensity at the maximum haptic feedback intensity for all calibration regions on the touch sensor surface. The controller 190 can then interpret a first vibration cycle for the haptic feedback module in order to deliver the target haptic feedback intensity to the particular calibration region based on the sampled set of haptic feedback intensities and the sequence of vibration cycles. The first vibration cycle contains instructions for a first oscillating voltage cycle containing a first voltage amplitude, a first phase off-set, and a first-time duration delivered to the haptic feedback module to achieve the desired target haptic feedback response.

The controller 190 can generate vibration images for the calibration regions on the touch sensor surface to apply targeted haptic feedback response across the touch sensor surface. For example, for a touch input interpreted on a first region on the touch sensor surface corresponding to the first calibration region, the touch system 100 can then: access the first vibration image for the first region containing a first vibration cycle defining a target haptic feedback intensity for the first region; and trigger the first vibration cycle for the haptic feedback module to deliver the target haptic feedback intensity to the first region on the touch sensor surface. The controller 190 can then compile each of the vibration images for each of the calibration regions on the touch sensor surface into a vibration template defining haptic feedback intensities across all regions on the touch sensor surface.

6. Multiple Probes

In one variation, the system 100 includes multiple discrete and offset probes, each supported by one boom (e.g., one linear actuator), each including a tip assembly 110, and coupled to one force (or pressure) sensor. In this variation, the system 100 can implement the foregoing methods and techniques to concurrently drive the set of probes into contact with the touch sensor surface at the target selection force, such as along contiguous segments of the calibration path or at discrete groups of waypoints across the touch sensor surface. For example, the system 100 can include ten probes located at a common, fixed pitch distance spanning the width of the touch sensor surface; accordingly, the system 100 can simultaneously sweep the ten probes linearly along a single, contiguous linear calibration path across the touch sensor surface.

However, the system 100 can include any other quantity or arrangement of probes and can sweep these probes across the touch sensor surface according to any other calibration path.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other system 100s and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for characterizing touch and haptics responses of surfaces, the system comprising:
   a tip assembly comprising:
      an outer tip comprising:
         a distal end;
         an aperture proximal the distal end; and
         an outer contact surface arranged about the aperture;
      a conductive inner tip:
         arranged concentrically within the outer tip;
         extending through the aperture of the outer tip; and
         comprising an inner contact surface;
      a circuit board adjacent a proximal end of the outer tip;
      a vibration sensor arranged on the circuit board and configured to output vibration signals representing vibrations transferred into the outer tip and into the conductive inner tip;
      a spring element:
         interposed between the circuit board and the conductive inner tip;
         coupling the conductive inner tip to a reference potential; and
         configured to yield responsive to a force applied to the conductive inner tip to translate the conductive inner tip within the outer tip;
   operable in a first configuration during application of the conductive inner tip on a touch sensor surface of a touch sensor at a first selection force, the inner contact surface offset vertically from the outer contact surface and the conductive inner tip effecting electrical values across drive and sense electrode pairs in the touch sensor in the first configuration; and
   operable in a second configuration during a haptic feedback cycle at the touch sensor in response to application of the conductive inner tip on the touch sensor surface of the touch sensor at a second selection force greater than the first selection force, the inner contact surface coplanar with the outer contact surface and the outer tip and the conductive inner tip transferring vibrations from the touch sensor surface into the vibration sensor in the second configuration.

2. The system of claim 1, further comprising a controller configured to:
   during application of the tip assembly at a first location on the touch sensor surface of the touch sensor at the first selection force in the first configuration:
      access a first touch image, from the touch sensor, representing a touch input detected on the touch sensor surface; and
      access a first force image, from the touch sensor, representing a force magnitude of the touch input detected on the touch sensor surface at the first location;
   during application of the tip assembly at the first location on the touch sensor surface of the touch sensor at the second selection force in the second configuration, capture a first haptic waveform at the vibration sensor representing vibrations across the touch sensor surface during the haptic feedback cycle; and
   fuse the first touch image, the first force image, and the first haptic waveform into a response map for the first location of the touch sensor surface of the touch sensor.

3. The system of claim 1:
   wherein the conductive inner tip comprises:
      a receptacle comprising a base defining the inner contact surface; and
      a lip arranged about a proximal end of the receptacle;
   wherein the outer tip comprises:
      an inner wall; and
      a platform arranged about the inner wall and configured to support the lip of the receptacle to locate the inner tip concentrically within the outer tip and extending from the aperture of the outer tip; and
   wherein the spring element:
      is arranged within the receptacle of the conductive inner tip; and comprises:
a first end electrically coupled to the base of the receptacle; and
a second end, opposite the first end, in contact to an electrical pad on the circuit board, the electrical pad coupled to the reference potential.

4. The system of claim 3:
wherein the tip assembly is operable in the first configuration during application of the conductive inner tip on the touch sensor surface of the touch sensor at the first selection force, the spring element configured to yield responsive to application of the first selection force at the conductive inner tip to:
offset the lip of the receptacle from the platform to partially translate the conductive inner tip within the outer tip in the first configuration; and
locate the inner contact surface of the conductive inner tip vertically offset from the outer contact surface of the outer tip in the first configuration; and
wherein the tip assembly is operable in the second configuration during a haptic feedback cycle at the touch sensor in response to application of the conductive inner tip on the touch sensor surface of the touch sensor at a second selection force greater than the first selection force, the spring element configured to yield responsive to application of the second selection force at the conductive inner tip to:
offset the lip of the receptacle from the platform to vertically translate the conductive inner tip within the outer tip in the first configuration;
couple the lip of the receptacle to a bottom side of the circuit board in the first configuration; and
locate the inner contact surface of the conductive inner tip coplanar with the outer contact surface of the outer tip in the first configuration.

5. The system of claim 3, wherein the conductive inner tip further comprises a guide ring arranged within the receptacle and configured to vertically constrain the spring element within the receptacle.

6. The system of claim 1:
further comprising:
an interface configured to couple a distal end of a probe; and
an enclosure:
coupling the interface; and
containing the tip assembly, the outer tip and the inner tip of the tip assembly extending from a bottom end of the enclosure; and
wherein the tip assembly further comprises:
a top cover arranged over the circuit board and the vibration sensor; and
a spacer element interposed between the interface and the top cover of the tip assembly and configured to dampen vibrations transferred from the interface to the vibration sensor.

7. The system of claim 1:
wherein the tip assembly is operable in the first configuration during application of the conductive inner tip on the touch sensor surface of the touch sensor at the first selection force, less than a fifty gram-force, the inner contact surface contacting the touch sensor surface of the touch sensor surface and the outer contact surface offset from the touch sensor surface of the touch sensor surface in the first configuration; and
wherein the tip assembly is operable in the second configuration during a haptic feedback cycle at the touch sensor in response to application of the conductive inner tip on the touch sensor surface of the touch sensor at a second selection force, greater than a fifty-gram force, the inner contact surface coplanar with the outer contact surface in the first configuration, and the inner contact surface and the outer contact surface contacting the touch sensor surface of the touch sensor in the first configuration.

8. The system of claim 1:
wherein the inner contact surface defines a first coefficient of friction;
wherein the outer contact surface defines a second coefficient of friction, greater than the first coefficient of friction, and configured to retain a local region of the touch sensor surface of the touch sensor during a haptic feedback cycle at the touch sensor.

9. The system of claim 1, further comprising a controller configured to:
during application of the tip assembly along a measurement path on the touch sensor surface of the touch sensor at the first selection force in the first configuration:
access a sequence of touch images representing magnitudes of forces detected on the touch sensor surface by the touch sensor; and
fuse the sequence of touch images into a touch response map representing magnitudes of forces detected on the touch sensor surface by the touch sensor responsive to application of the first selection force on the touch sensor surface; and
during application of the tip assembly across a set of keypoints on the touch sensor surface of the touch sensor at the second selection force in the second configuration:
access a set of haptic waveforms captured by the vibration sensor representing vibrations detected on the touch sensor surface; and
fuse the set of haptic waveforms into a haptic response map representing haptic intensities detected on the touch sensor responsive to application of the second selection force on the touch sensor surface.

10. The system of claim 1:
wherein the outer tip further comprises:
a first support region at a proximal end of the outer tip;
a second support region, opposite the first support region, at the proximal end of the outer tip; and
a channel interposed between the first support region and the second support region;
wherein the circuit board comprises:
a first board section extending over the first support region of the outer tip;
a second board section, opposite the first board section, extending over the second support region of the outer tip; and
a center board section:
interposed between the first board section and the second board section; and
extending over the channel of the outer tip to enclose the conductive inner tip within the outer tip; and
wherein the vibration sensor:
is arranged on the center board section of the circuit board; and
is configured to output vibration signals:
transferred from the conductive inner tip to the center board section of the circuit board; and
transferred from the outer tip to the first board section and the second board section of the circuit board.

11. The system of claim 10, wherein the spring element:
is interposed between the conductive inner tip and the center section of the circuit board adjacent the vibration sensor; and
configured to transfer vibrations in the conductive inner tip to the vibration sensor on the circuit board.

12. The system of claim 1:
wherein the outer contact surface:
defines an annular contact surface proximal the distal end of the outer tip; and
is formed of an elastomeric material configured to maintain contact with a local region the touch sensor surface of the touch sensor during the haptic feedback cycle; and
wherein the inner contact surface:
defines a circular contact surface concentric with the annular contact surface of the outer tip; and
is formed of a conductive material configured to effect electrical values across drive and sense electrode pairs at the touch sensor.

13. The system of claim 1, wherein the spring element comprises a conductive foam material interposed between the circuit board and the conductive inner tip.

14. The system of claim 1, wherein the vibration sensor comprises a multi-axis vibration sensor configured to:
output a first vibration signal representing vibrations transferred into the outer tip and the conductive inner tip within a vibration plane defined by the touch sensor surface; and
output a second vibration signal representing vibrations transferred into the outer tip and the conductive inner tip orthogonal the vibration plane defined by the touch sensor surface.

15. The system of claim 1:
wherein the outer tip:
comprises a channel extending from the proximal end to the distal end; and
defines a tip axis;
wherein the circuit board extends over the channel of the outer tip;
wherein the spring element:
is arranged within the channel of the outer tip aligned to the tip axis; and
is configured to locate the conductive inner tip offset the circuit board in response to absence of an applied force to the conductive inner tip; and
is configured to yield in response to application of the second selection force at the conductive inner tip that vertically translates the conductive inner tip within the channel of the outer tip to contact the circuit board.

16. A system for characterizing touch and haptics responses of surfaces, the system comprising:
a tip assembly comprising:
an outer tip comprising:
a distal end;
an aperture proximal the distal end; and
an outer contact surface arranged about the aperture;
a conductive inner tip:
arranged concentrically within the outer tip;
extending through the aperture of the outer tip; and
comprising an inner contact surface;
a circuit board adjacent a proximal end of the outer tip;
a vibration sensor arranged on the circuit board and configured to output vibration signals representing vibrations transferred into the outer tip and into the conductive inner tip;
a spring element:
interposed between the circuit board and the conductive inner tip;
coupling the conductive inner tip to a reference potential; and
configured to yield responsive to a force, exceeding a target selection force, applied to the conductive inner tip to translate the conductive inner tip within the outer tip;
a controller configured to:
during application of the tip assembly at a first location on a touch sensor surface of a touch sensor at a first selection force, less than the target selection force, access a first touch image, from the touch sensor, representing a force magnitude detected on the touch sensor surface;
during a haptic feedback cycle at the touch sensor in response to application of the conductive inner tip and the outer tip at the first location on the touch sensor surface at a second selection force, exceeding the target selection force, capture a haptic waveform, at the vibration sensor, representing vibrations detected across the touch sensor surface during the haptic feedback cycle; and
fuse the touch image and the haptic waveform into a response map of the touch sensor.

17. The system of claim 16:
wherein the conductive inner tip comprises:
a receptacle comprising a base defining the inner contact surface; and
a lip arranged about a proximal end of the receptacle;
wherein the outer tip comprises:
an inner wall; and
a platform arranged about the inner wall and configured to support the lip of the receptacle to locate the inner tip concentrically within the outer tip and extending from the aperture of the outer tip; and
wherein the spring element:
is arranged within the receptacle of the conductive inner tip; and
comprises:
a first end electrically coupled to the base of the receptacle; and
a second end, opposite the first end, in contact to an electrical pad on the circuit board, the electrical pad coupled to the reference potential.

18. The system of claim 16:
wherein the inner contact surface defines a first coefficient of friction;
wherein the outer contact surface defines a second coefficient of friction, greater than the first coefficient of friction, and configured to retain a local region of the touch sensor surface of the touch sensor during a haptic feedback cycle at the touch sensor.

19. The system of claim 16:
wherein the outer contact surface:
defines an annular contact surface proximal the distal end of the outer tip; and
is formed of an elastomeric material configured to maintain contact with a local region the touch sensor surface of the touch sensor during the haptic feedback cycle; and
wherein the inner contact surface:
defines a circular contact surface concentric with the annular contact surface of the outer tip; and is formed of a conductive material configured to effect electrical values across drive and sense electrode pairs at the touch sensor.

20. A tip assembly comprising:

an outer tip comprising:
- a distal end;
- an aperture proximal the distal end; and
- an outer contact surface arranged about the aperture;

an inner tip:
- arranged concentrically within the outer tip;
- extending through the aperture of the outer tip; and
- comprising an inner contact surface;

a circuit board arranged adjacent a proximal end of the outer tip;

a vibration sensor arranged on the circuit board and configured to output vibration signals representing vibrations transferred into the outer tip and into the inner tip;

a spring element:
- interposed between the circuit board and the inner tip;
- configured to locate the inner contact surface vertically offset from the outer contact surface in response to absence of an applied force at the inner tip; and
- configured to yield in response to application of a force, exceeding a target selection force, at the inner tip that vertically translates the inner tip within the outer tip and locates the inner contact surface coplanar with the outer contact surface.

* * * * *